Jan. 14, 1941.                    W. WHITE                    2,228,713
                       AIR PRESSURE RETAINING VALVE
                          Filed March 18, 1940

INVENTOR.
Wilbur White
BY A. L. Fisher
ATTORNEY.

Patented Jan. 14, 1941

2,228,713

UNITED STATES PATENT OFFICE 2,228,713

AIR PRESSURE RETAINING VALVE

Wilbur White, Salamanca, N. Y.

Application March 18, 1940, Serial No. 324,563

1 Claim. (Cl. 303—77)

This invention relates to air pressure retaining valves for use upon the air brake assemblies of railway cars.

Such assemblies conventionally include for each car of a train, a train pipe for conducting the air from the main air reservoir of the locomotive, a brake cylinder, an auxiliary air reservoir, a triple valve unit operatively connecting the train pipe with the auxiliary reservoir, and a pressure retaining valve of some sort for retaining a predetermined reduced air pressure in the brake cylinder in the operation of releasing the brakes.

An important object of the present invention is to provide an improved form of pressure retainer valve or unit, whereby a predetermined reduced air pressure is held in the brake cylinder and allowed gradually to escape, thus facilitating the recharging of the system on a grade and preventing the sliding of the car wheels upon the rails and causing "flats."

Another object of the invention is to provide in a device of the kind referred to, a closed casing having at one portion oppositely disposed exhaust ports, a valve member movably mounted in the casing to cover and clear the exhaust ports thereof, said member having spaced exhaust bores for alternate alignment with the exhaust ports of the casing, means in one of the exhaust bores for partially obstructing air-flow therethrough, means for admitting compressed air into the casing at one side of the valve member for moving same for aligning its obstructed exhaust bore with the exhaust ports of the casing, and means for moving the valve member oppositely for so aligning its unobstructed exhaust bore.

Another object is to provide in a device of the kind referred to, an elongate hollow cylindrical casing for mounting horizontally adjacent the brake cylinder, one end thereof having vertically and diametrically opposed exhaust ports, one for connecting with the exhaust port of the triple valve and the other being open to the atmosphere, a round valve block snugly and slidably mounted in the casing and adapted for movement over or clear of the exhaust ports, the said valve block being diametrically and vertically pierced by two spaced and parallel exhaust bores adapted for alternate alignment with the said exhaust ports of the casing, the inner exhaust bore being diametrically enlarged interiorly of the valve block and having a ball-valve seat formed at its lower end, a ball valve of suitable weight seated freely within the said enlarged exhaust bore upon the valve seat thereof, the opposite closed end of the casing having a leak duct and two vertically and diametrically opposed bores formed through its walls, the lower bore constituting an air intake port for connecting with the train pipe and having a valve seat formed at its inner side, the margins of the upper bore being threaded to engage a handscrew, a tubular hand screw threadedly seated through the upper bore, a ball-valve seated upon the valve seat of the intake port, having a shank passed slidably up into the tubular hand screw and bearing against a coil spring seated within the hand screw, whereby air under pressure may be forced into the casing for forcing the valve block outwardly over the exhaust ports of the casing with the inner exhaust bore of the block and its ball valve aligned therewith for partially exhausting air from the brake cylinder, and means for forcing the block inwardly of the casing as the air leaks out the said leak duct, for aligning the outer exhaust bore of the block with the exhaust ports of the casing for completely exhausting air from the brake cylinder.

With the stated objects in view, together with such other objects and advantages as may appear in the specification, a preferred embodiment of the invention is shown in the drawing, wherein.

Figure 1:
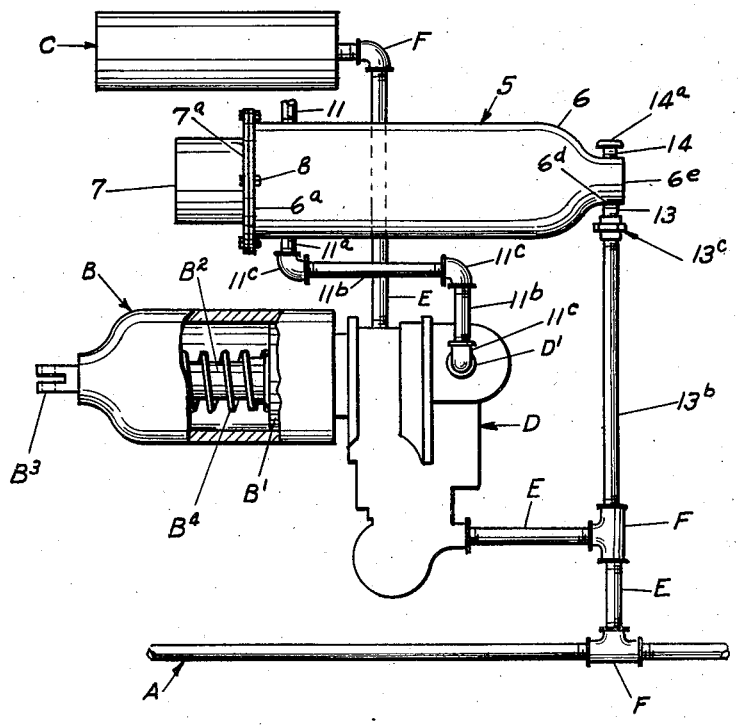
Fig. 1 is a diagrammatic elevation of a portion of an air brake system of standard type, showing however my improved retainer valve in position. A section of the brake cylinder is broken out.
Figure 2:
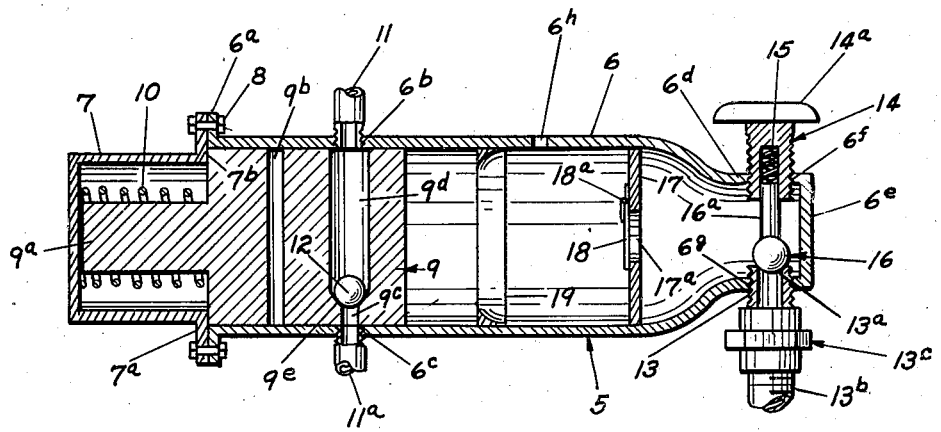
Fig. 2 is a longitudinal section of the retainer valve unit on an enlarged scale.

A conventional air brake assembly for a train of cars, includes for each car a train pipe A, a brake cylinder unit B, an auxiliary air reservoir C, and a triple valve unit D for connecting the train pipe A to the auxiliary air reservoir C through suitable pipes and connecting joints indicated generally at E and F.

The brake cylinder unit has slidably mounted therein a piston B1 joined to a push rod B2 having at its outer end brake rigging B3 for connecting to the regular brake arm (not shown). The piston and rod are normally held retracted to their inoperative position within the cylinder by means of a coil spring B4 mounted around the piston rod within the cylinder and braced between the piston and the cylinder head. Compressed air for operating or setting the brake arm and shoes flows from the auxiliary reservoir through the triple valve into the closed end of the brake cylinder back of the piston, thus forcing the piston outwardly and setting the brakes.

The triple valve includes a piston-controlled slide valve in the housing which normally rests inactive between the equal air pressures upon the inner side of the piston from the auxiliary air reservoir and upon its outer side from the train pipe. In this position the valve also closes the air ducts or leads from the auxiliary reservoir to the brake cylinder, back of its piston. If air pressure is lowered in the train line by the engineer operating his valves, or by any other cause, the greater air pressure from the auxiliary reservoir operates the slide valve, opening ducts and leads into the brake cylinder, pushing the piston and rod out and sets the brakes. This movement of the slide-valve also closes the inlets from the train pipe and the exhaust ducts and air leads from behind the brake piston. This being all conventional structure is not shown or described here in detail.

However as the train slows down, it is desirable to gradually release the brake shoe pressure upon the wheels, to prevent the wheels locking and sliding thereby forming flat spots, and also to facilitate on a grade, the recharging of the train pipes and auxiliary air reservoirs.

My automatic air retaining valve unit, represented generally at 5, is designed for this purpose. The unit 5 is mounted horizontally on the car (not shown) adjacent the described conventional elements of the assembly as similarly mounted, and comprises an elongate hollow and cylindrical casing 6 open at one end and closed thereat by a smaller hollow cylindrical cap 7, by means of bolts 8 passed through flanges 6a, 7a spread outwardly from the open ends of the casing and the cap, the lesser diameter of the cap 7 providing at the juncture an inset stop shoulder or abutment 7b. A solid cylindrical valve block 9 is snugly and slidably seated in the casing 6 and has a reduced shank 9a which extends outwardly into the hollow cap 7. A coil expansion spring 10 is seated over this shank 9a and is adapted to urge the block 9 inwardly of the casing 6. The outward movement of the block is limited by the shoulder 7b. This end of the casing 6 is pierced diametrically by two vertically aligned upper and lower exhaust ports 6b, 6c, the margins thereof being threaded to engage the threaded ends of upper and lower exhaust pipes 11, 11a. The block 9 is pierced diametrically by two spaced exhaust bores 9b, 9c, adapted as the block is moved to alternately align with the pipes 11, 11a, the arrangement and spacing of the exhaust bores being such that when the block 9 is moved outward to the stop shoulder 7b the inner bore 9c will align with the pipes 11, 11a, with the outer bore 9b positioned between the bore 9c and the shoulder 7b. The inner exhaust bore 9c is enlarged diametrically within the block 9, as shown at 9d, from a point 9e spaced upwardly from the lower mouth of the bore 9c, and a ball valve seat is formed at the point 9e. A ball 12 of requisite weight, 15 to 20 lbs., to retain a corresponding air pressure in the brake cylinder on release of the brakes, is freely seated within the enlarged bore 9d upon the seat 9e.

The opposite end of the casing 6 is reduced to form a neck 6d, closed at its end 6e, and diametrically and vertically aligned bores 6f, 6g are pierced through the walls of this neck.

The margins of these bores are threaded, the lower 6g for engaging a threaded intake nipple 13 formed with a ball valve seat 13a at its inner end, and the upper 6f for engaging a tubular, threaded hand screw 14 closed at its outer end and having mounted thereat a hand wheel 14a. A coil expansion spring 15 is seated upwardly within the tubular portion of the screw 14, and a ball valve 16 having a rounded shank 16a is seated on the valve seat 13a, the shank 16a being slidably entered into the tubular screw 14 against the spring 15, the latter pressing the ball valve 16 to its seat. A check valve plate 17 is diametrically mounted in the casing 6 inwardly of its neck portion 6d, the same being pierced by an air duct or port 17a, and the latter being covered by a flap check valve 18 hinged at 18a to open inwardly towards the valve block 9 for admitting compressed air into the interior of the casing against the valve block 9. A stop ring 19 is mounted circumferentially in the casing 6 between the valve plate 17 and the block 9. The ring 19 is so exactly spaced from the block 9 as to limit the inward movement of the block 9 at the point of alignment of its outer exhaust bore 9b with the exhaust pipes 11, 11a, thus providing a clear exhaust passage through the valve block 9. An air leak duct 6h is pierced through the casing wall between the check valve plate 17 and ring 19.

The exhaust port D1 of the triple valve is connected with the exhaust pipe 11a of the unit 5 by pipe extensions 11b and joints 11c. The air intake nipple 13 of the unit 5 is connected directly with the train pipe A, through the joints F, by a pipe extension 13b and union 13c.

In operation, the ball valve 16 is set at a pressure equalling the normal pressure of the train pipe, while the ball valve 12 is of a weight corresponding to the pressure desired to be retained in the brake cylinder on the release of the brakes. When the brakes are released, and the engineer desires to recharge the system the ball valve 12 retains a certain pressure against the brake shoes in the process of recharging. This is advantageous in descending grades and for preventing locking and sliding of the wheels as above pointed out. This result is accomplished by the engineer increasing the train pipe pressure above its normal pressure. This results in raising the valve 16 and admitting compressed air to the valve block 9, pushing said block outward and aligning the exhaust bore 9c with the pipes 11, 11a. The exhaust pressure from the brake cylinder then forces through the bore 9c until it is stopped by the weight of the ball 12. Thereafter the air pressure leaks gradually out around the ball 12 and simultaneously the air pressure in the casing 6 leaks out at the duct 6h. As the pressure in the casing is reduced, the spring 10 forces the block 9 inwardly, aligning the bore 9b with the pipes 11, 11a and thus completely exhausting the brake cylinder, the piston and other associated elements are retracted or returned to their normal positions. During this intermediate time the brake shoes are held to the wheels for the purposes specified.

While I have here shown and described certain specific structural features of the invention, the same may be changed within the scope of the claim.

I claim:

In a device of the kind described, an elongate hollow cylindrical casing for mounting horizontally adjacent the brake cylinder, one end thereof having vertically and diametrically opposed exhaust ports, one for connecting with the exhaust port of the triple valve and the other being open to the atmosphere, a round valve block snugly and slidably mounted in the casing and adapted for movement over or clear of the exhaust ports, the said valve block being diametrically and vertically pierced by two spaced and parallel exhaust bores adapted for alternate alignment with the said exhaust ports of the casing, the inner exhaust bore being diametrically enlarged interiorly of the valve block and having a ball-valve seat formed at its lower end, a ball valve of suitable weight seated freely within the said enlarged exhaust bore upon the valve seat thereof, the opposite closed end of the casing having a leak duct and two vertically and diametrically opposed bores formed through its walls, the lower bore constituting an air intake port for connecting with the train pipe and having a valve seat formed at its inner side, the margins of the upper bore being threaded to engage a hand-screw, a tubular hand screw threadedly seated through the upper bore, a ball-valve seated upon the valve seat of the intake port, having a shank passed slidably up into the tubular hand screw and bearing against a coil spring seated within the hand screw, whereby air under pressure may be forced into the casing for forcing the valve block outwardly over the exhaust ports of the casing with the inner exhaust bore of the block and its ball valve aligned therewith for partially exhausting air from the brake cylinder, and means for forcing the block inwardly of the casing as the air leaks out the said leak duct, for aligning the outer exhaust bore of the block with the exhaust ports of the casing for completely exhausting air from the brake cylinder.

WILBUR WHITE.